United States Patent
Hsiao et al.

(10) Patent No.: US 10,642,731 B2
(45) Date of Patent: May 5, 2020

(54) MEMORY MANAGEMENT METHOD AND STORAGE CONTROLLER

(71) Applicant: Shenzhen EpoStar Electronics Limited CO., Shenzhen (CN)

(72) Inventors: Yu-Hua Hsiao, Hsinchu County (TW); Hung-Chih Hsieh, Hsinchu County (TW)

(73) Assignee: Shenzhen EpoStar Electronics Limited CO., Shenzhen (CN)

( * ) Notice: Subject to any disclaimer, the term of this patent is extended or adjusted under 35 U.S.C. 154(b) by 0 days.

(21) Appl. No.: 16/137,539

(22) Filed: Sep. 20, 2018

(65) Prior Publication Data

US 2020/0042441 A1    Feb. 6, 2020

(30) Foreign Application Priority Data

Aug. 1, 2018    (TW) .............................. 107126694 A

(51) Int. Cl.
*G06F 3/06*    (2006.01)
*G06F 12/02*    (2006.01)

(52) U.S. Cl.
CPC ........ *G06F 12/0269* (2013.01); *G06F 3/0608* (2013.01); *G06F 3/0652* (2013.01); *G06F 3/0659* (2013.01); *G06F 3/0679* (2013.01); *G06F 2212/1024* (2013.01); *G06F 2212/1044* (2013.01); *G06F 2212/7205* (2013.01)

(58) Field of Classification Search
CPC combination set(s) only.
See application file for complete search history.

(56) References Cited

FOREIGN PATENT DOCUMENTS

| TW | 201510723 | 3/2015 |
|---|---|---|
| TW | I613652 | 2/2018 |
| TW | I621018 | 4/2018 |
| TW | I629592 | 7/2018 |

OTHER PUBLICATIONS

"Office Action of Taiwan Counterpart Application," issued on May 27, 2019, p. 1-p. 11.

*Primary Examiner* — Yong J Choe
(74) *Attorney, Agent, or Firm* — JCIPRNET

(57) ABSTRACT

A memory management method is provided. The method includes performing a garbage collection command; generating a garbage collection information table having a predetermined size according to one or more recycled block stripes, and writing the garbage collection information table into a target block stripe, wherein the garbage collection information table includes an identification tag, a local recycled block stripe list and first padding data; reading valid data in the one or more recycled block stripes, and writing the valid data into the target block stripe, wherein the written valid data is behind and immediately adjacent to the garbage collection information table being written to; and closing the target block stripe, and adding the local recycled block stripe list into a global recycled block stripe list in a buffer memory, so as to complete the garbage collection command.

10 Claims, 6 Drawing Sheets global recycled block stripe list

MEMORY MANAGEMENT METHOD AND STORAGE CONTROLLER

CROSS-REFERENCE TO RELATED APPLICATION

This application claims the priority benefit of Taiwan application serial no. 107126694, filed on Aug. 1, 2018. The entirety of the above-mentioned patent application is hereby incorporated by reference herein and made a part of this specification.

BACKGROUND OF THE DISCLOSURE

Field of the Disclosure

The disclosure relates to a memory management method, and more particularly to a memory management method and a storage controller suitable for a storage device equipped with a rewritable non-volatile memory module.

Description of Related Art

Generally, a storage controller of a storage device equipped with a rewritable non-volatile memory module performs a garbage collection operation to move valid data in a plurality of source physical blocks to a plurality of new physical blocks, and erases the plurality of source physical blocks to release the space occupied by invalid data of the plurality of source physical blocks.

Traditionally, when there is any information change in a plurality of physical blocks during garbage collection operations on the plurality of physical blocks, information of the plurality of physical blocks originally maintained in the buffer memory corresponding to the executed garbage collection operation is saved to the rewritable non-volatile memory module by a snapshot operation. As a result, since snapshot operation is frequently performed during the execution of the garbage collection operation, a large amount of time consumed due to the snapshot operation causes a significant delay of the storage device.

In view of the above, it is a goal for practitioners of the field to save the information of the garbage collection operation more efficiently in order to reduce the delay contributed by the garbage collection operation and thereby improving the operation efficiency of the storage device.

SUMMARY OF THE DISCLOSURE

The disclosure provides a memory management method for generating a garbage collection information table according to the information of a recycled block stripe subjected to the garbage collection operation when starting the garbage collection operation, and writing the garbage collection information table into a target block stripe corresponding to the garbage collection operation. In addition, the memory management method may also perform a recovery operation when a power-off event occurs to rebuild a global recycled block stripe list using the garbage collection information table stored in the target block stripe.

An embodiment of the disclosure provides a memory management method, adapted for a storage device equipped with a rewritable non-volatile memory module, wherein the rewritable non-volatile memory module has a plurality of physical blocks. The plurality of physical blocks are grouped into a plurality of block stripes. The method includes a memory management method, and is adapted for a storage device equipped with a rewritable non-volatile memory module, wherein the rewritable non-volatile memory module has a plurality of physical blocks, and the plurality of physical blocks are grouped into a plurality of block stripes, the method comprising: performing a garbage collection command, wherein the garbage collection command instructs to collect valid data of one or more recycled block stripes to a target block stripe; generating a garbage collection information table having a predetermined size according to the one or more recycled block stripes, and writing the garbage collection information table to the target block stripe, wherein the garbage collection information table includes an identification tag, a local recycled block stripe list, and first padding data; reading valid data of the one or more recycled block stripes, and writing the valid data to the target block stripe, wherein the written valid data is behind and immediately adjacent to the garbage collection information table being written to; and closing the target block stripe, and adding the local recycled block stripe list to a global recycled block stripe list of a buffer memory to complete the garbage collection command.

An embodiment of the disclosure provides a storage controller for controlling a storage device equipped with a rewritable non-volatile memory module. The storage controller includes: a connection interface circuit, a memory interface control circuit, a garbage collection management circuit unit and a processor. The connection interface circuit is coupled to a host system. The memory interface control circuit is coupled to the rewritable non-volatile memory module, wherein the rewritable non-volatile memory module has a plurality of physical blocks, and the plurality of physical blocks are grouped into a plurality of block stripes. The processor is coupled to the connection interface circuit, the memory interface control circuit and the garbage collection management circuit unit. The garbage collection management circuit unit is configured to execute a garbage collection command received from the processor, wherein the garbage collection command instructs to collect valid data of one or more recycled block stripes to a target block stripe, wherein the garbage collection management circuit unit is further configured to generate a garbage collection information table having a predetermined size according to the one or more recycled block stripes, and instructs the memory interface control circuit to write the garbage collection information table to the target block stripe. The garbage collection information table includes an identification tag, a local recycled block stripe list, and first padding data. The garbage collection management circuit unit is further configured to read valid data of the one or more recycled block stripes, and write the valid data to the target block stripe, wherein the written valid data is behind and immediately adjacent to the garbage collection information table being written to. The garbage collection management circuit unit is further configured to close the target block stripe and add the local recycled block stripe list to the global recycled block stripe list in the buffer memory to complete the garbage collection command.

Based on the above, the memory management method and the storage controller provided by the embodiments of the disclosure are capable of generating the garbage collection information table according to the recycled block stripe subjected to the garbage collection operation only when responding to starting the garbage collection operation, writing the garbage collection information table to the target block stripe corresponding to the garbage collection operation, and copying the valid data of the recycled block stripe to the target block stripe having the garbage collection information table, thereby completing the garbage collection operation. In addition, the garbage collection information table in each of the target block stripes may also be used to rebuild the global recycled block stripe list to assist in managing the use of the block stripe of the overall storage device. In this way, in the condition where the access delay caused by the garbage collection operation is reduced, the data stored in the storage device can still have reliability, thereby improving the operation efficiency of the storage device.

In order to make the aforementioned features and advantages of the disclosure more comprehensible, embodiments accompanying figures are described in detail below.

DESCRIPTION OF EMBODIMENTS

In the present embodiment, a storage device includes a rewritable non-volatile memory module and a storage device controller (also referred to as a storage controller or a storage control circuit). In addition, the storage device is usually used together with a host system so the host system can write data into or read data from the storage device.

Figure 1:
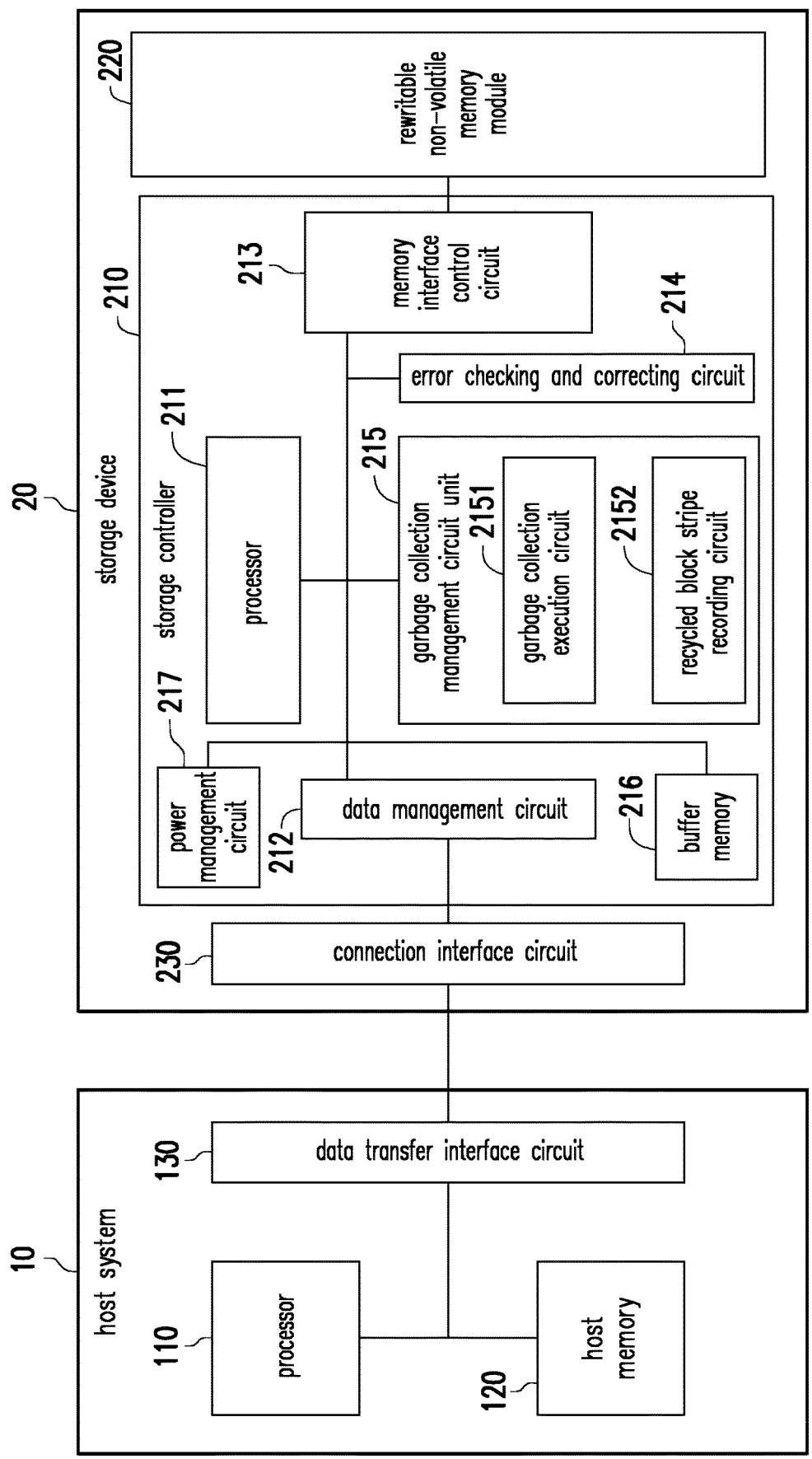
FIG. 1 is a block diagram illustrating a host system and a storage device according to an embodiment of the disclosure.

FIG. 1 is a block diagram illustrating a host system and a storage device according to an embodiment of the disclosure.

With reference to FIG. 1, a host system 10 includes a processor 110, a host memory 120 and a data transfer interface circuit 130. In this embodiment, the data transfer interface circuit 130 is coupled to (or, electrically connected to) the processor 110 and the host memory 120. In another embodiment, the processor 110, the host memory 120 and the data transfer interface circuit 130 are coupled to one another by utilizing a system bus.

A storage device 20 includes a storage controller 210, a rewritable non-volatile memory module 220 and a connection interface circuit 230. Among them, the storage controller 210 includes a processor 211, a data management circuit 212 and a memory interface control circuit 213.

In this embodiment, the host system 10 is coupled to the storage device 20 through the data transfer interface circuit 130 and the connection interface circuit 230 of the storage device 20 to perform a data accessing operation. For example, the host system 10 can store data to the storage device 20 or read data from the storage device 20 through the data transfer interface circuit 130.

In the present embodiment, the processor 110, the host memory 120 and the data transfer interface circuit 130 may be disposed on a main board of the host system 10. The number of the data transfer interface circuit 130 may be one or more. Through the data transfer interface circuit 130, the main board may be coupled to the storage device 20 wired or wirelessly. The storage device 20 may be, for example, a flash drive, a memory card, a solid state drive (SSD) or a wireless memory storage device. The wireless memory storage device may be, for example, a memory storage device based on various wireless communication technologies, such as a NFC (Near Field Communication) memory storage device, a WiFi (Wireless Fidelity) memory storage device, a Bluetooth memory storage device, a BLE (Bluetooth low energy) memory storage device (e.g., iBeacon). Further, the main board may also be coupled to various I/O devices including a GPS (Global Positioning System) module, a network interface card, a wireless transmission device, a keyboard, a monitor and a speaker through the system bus.

In this embodiment, the data transfer interface circuit 130 and the connection interface circuit 230 are an interface circuit compatible with a Peripheral Component Interconnect Express (PCI Express) interface standard. Further, a data transfer is performed between the data transfer interface circuit 130 and the connection interface circuit 230 by using a communication protocol of a Non-Volatile Memory express (NVMe) interface standard.

Nevertheless, it should be understood that the disclosure is not limited to the above. The data transfer interface circuit 130 and the connection interface circuit 230 may also be compatible to a PATA (Parallel Advanced Technology Attachment) standard, an IEEE (Institute of Electrical and Electronic Engineers) 1394 standard, a Serial Advanced Technology Attachment (SATA) standard, a USB (Universal Serial Bus) standard, a SD interface standard, a UHS-I (Ultra High Speed-I) interface standard, a UHS-II (Ultra High Speed-II) interface standard, a MS (Memory Stick) interface standard, a Multi-Chip Package interface standard, a MMC (Multi Media Card) interface standard, an eMMC interface standard, a UFS (Universal Flash Storage) interface standard, an eMCP interface standard, a CF interface standard, an IDE (Integrated Device Electronics) interface standard or other suitable standards. Further, in another embodiment, the connection interface circuit 230 and the storage controller 210 may be packaged into one wafer, or the connection interface circuit 230 may be disposed outside a wafer containing the storage controller 210.

In this embodiment, the host memory 120 is configured to temporarily store commands or data executed by the processor 110. For instance, in this exemplary embodiment, the host memory 120 may be a DRAM (Dynamic Random Access Memory), or a SRAM (Static Random Access Memory) and the like. Nevertheless, it should be understood that the disclosure is not limited in this regard, and the host memory 120 may also be other appropriate memories.

The storage controller 210 is configured to execute a plurality of logic gates or control commands, which are implemented in a hardware form or in a firmware form, and to perform operations of writing, reading or erasing data in the rewritable non-volatile memory storage module 220 according to the commands of the host system 10.

More specifically, the processor 211 in the storage controller 210 is a hardware with computing capabilities, which is configured to control overall operation of the storage controller 210. Specifically, the processor 211 has a plurality of control commands and the control commands are executed to perform various operations such as writing, reading and erasing data during operation of the storage device 20.

It should be noted that, in the present embodiment, the processor 110 and the processor 211 are, for example, a central processing unit (CPU), a micro-processor, other programmable microprocessors, a digital signal processor (DSP), a programmable controller, an application specific integrated circuits (ASIC), a programmable logic device (PLD) or other similar circuit elements. The disclosure is not limited in this regard.

In an embodiment, the storage controller 210 further includes a ROM (not illustrated) and a RAM (not illustrated). More particularly, the ROM has a boot code, which is executed by the processor 211 to load the control commands stored in the rewritable non-volatile memory module 220 into the RAM of the storage controller 210 when the storage controller 210 is enabled. Then, the control commands are executed by the processor 211 to perform operations, such as writing, reading or erasing data. In another embodiment, the control commands of the processor 211 may also be stored as program codes in a specific area (for example, physical storage units in the rewritable non-volatile memory module 220 dedicated for storing system data) of the rewritable non-volatile memory module 220.

In this embodiment, as described above, the storage controller 210 further includes the data management circuit 212 and the memory interface control circuit 213. It should be noted that, operations performed by each part of the storage controller 210 may also be considered as operations performed by the storage controller 210.

The data management circuit 212 is coupled to the processor 211, the memory interface control circuit 213 and the connection interface circuit 230. The data management circuit 212 is configured to accept an instruction from processor 211 to transmit data. For example, the data may be read from the host system 10 (e.g., the host memory 120) through the connection interface circuit 230, and the read data may be written into the rewritable non-volatile memory module 220 through the memory interface control circuit 213 (e.g., a writing operation performed according to the write command from the host system 10). As another example, the data may be read from one or more physical units of the rewritable non-volatile memory module 220 through the memory interface control circuit 213 (the data may be read from one or more memory cells in one or more physical units), and the read data may be written into the host system 10 (e.g., the host memory 120) through the connection interface circuit 230 (e.g., a reading operation performed according to a read command from the host system 10). In another embodiment, the data management circuit 212 may also be integrated into the processor 211.

The memory interface control circuit 213 is configured to receive an instruction from processor 211, and with the data management circuit 212 to perform a write (also referred to as program), read or erase operation on the rewritable non-volatile memory module 220.

For instance, the processor 211 may execute a write command sequence to instruct the memory interface control circuit 213 to write the data into the rewritable non-volatile memory module 220; the processor 211 can execute a read command sequence to instruct the memory interface control circuit 213 to read the data from one or more physical units (also referred to as target physical unit) corresponding to the read command in the rewritable non-volatile memory module 220; the processor 211 can execute an erase command sequence to instruct the memory interface control circuit 213 to perform the erasing operation for the rewritable non-volatile memory module 220. Each of the write command sequence, the read command sequence and the erase command sequence may include one or more program codes or command codes, which are configured to perform the corresponding writing, reading and erasing operations on the rewritable non-volatile memory module 220. In an embodiment, the processor 211 may further send other types of command sequences to the memory interface control circuit 213 so as to perform corresponding operations on the rewritable non-volatile memory module 220.

In addition, data to be written to the rewritable non-volatile memory module 220 is converted into a format acceptable by the rewritable non-volatile memory module 220 through the memory interface control circuit 213. Specifically, if the processor 211 is to access the rewritable non-volatile memory module 220, the processor 211 transmits a corresponding command sequence to the memory interface control circuit 213 to instruct the memory interface control circuit 213 to perform a corresponding operation. For example, the command sequences may include a write command sequence instructing to write data, a read command sequence instructing to read data, an erase command sequence instructing to erase data and corresponding command sequences instructing to perform various memory operations (e.g., changing a plurality of predetermined read voltage values of a predetermined read voltage set to perform a read operation, or performing a garbage collecting program and so on). The command sequences may include one or more signals, or data from the bus. The signals or the data may include command codes and program codes. For example, information such as identification codes and memory addresses are included in the read command sequence.

The rewritable non-volatile memory module 220 is coupled to the storage controller 210 (the memory control circuit unit 213) and configured to store data written from the host system 10. The rewritable non-volatile memory module 220 may be a SLC (Single Level Cell) NAND flash memory module (i.e., a flash memory module capable of storing one bit in one memory cell), an MLC (Multi Level Cell) NAND flash memory module (i.e., a flash memory module capable of storing two bits in one memory cell), a TLC (Triple Level Cell) NAND flash memory module (i.e., a flash memory module capable of storing three bits in one memory cell), a QLC (Quadruple Level Cell) NAND flash memory module (i.e., a flash memory module capable of storing four bits in one memory cell), a 3D NAND flash memory module or a vertical NAND flash memory module, a vertical NAND flash memory module or a vertical NAND flash memory module other flash memory modules or any memory module having the same features. The memory cells in the rewritable non-volatile memory module 220 are arranged in an array.

In this embodiment, the rewritable non-volatile memory module 220 has a plurality of word lines, wherein each word line among the word lines includes a plurality of memory cells. The memory cells on the same word line constitute one or more physical programming units (physical pages). In addition, a plurality of physical programming units may constitute one physical unit (a physical block or a physical erasing unit).

In this embodiment, one physical page is used as a minimum unit for writing (programming) data. The physical unit is a minimum unit for erasing (i.e., each physical unit includes a minimum number of memory cells to be erased together). Further, the address of each of the physical pages may also be referred to as physical address.

It should be noted that, in the embodiment, the system data configured for recording information of one physical unit may be recorded by using one or more memory cells in the physical unit, or recorded by using one or more memory cells of a specific physical unit in one system region that is configured to record all of the system data.

Further, it should be understood that, when the processor 211 groups the memory cells (or the physical blocks) in the rewritable non-volatile memory module 220 for the corresponding management operations, the memory cells (or the physical blocks) are logically grouped and their actual locations are not changed.

The storage controller 210 assigns a plurality of logical units for the rewritable non-volatile memory module 220. The host system 10 accesses user data stored in a plurality of physical units through the assigned logical units. Here, each of the logical units may be composed of one or more logical addresses. For example, the logical unit may be a logical block, a logical page, or a logical sector. Each logical unit may be mapped to one or more physical units, wherein the physical unit may be one or more physical addresses, one or more physical sectors, one or more physical programming units, or one or more physical erasing units. In the present embodiment, the logical unit is a logical block, and the logical sub-unit is a logical page. Each logical unit includes a plurality of logical sub-units. In the present embodiment, the address of the logical sub-unit may also be referred to as logical address.

Additionally, the storage controller 210 would create a logical-to-physical address mapping table and a physical-to-logical address mapping table for recording a mapping relation between the logical addresses assigned to the rewritable non-volatile memory module 220 and the physical addresses. In other words, the storage controller 210 can look up for the physical unit mapped by one logical address by using the logical-to-physical address mapping table, and the storage controller 210 can look up for the logical address mapped by one physical address by using the physical-to-logical address mapping table. Nonetheless, the technical concept for the mapping relation between the logical addresses and the physical addresses is a well-known technical means in the field, which is not repeated hereinafter. In typical operation of storage controller, the logical-to-physical address mapping table and the physical-to-logical address mapping table may be maintained in a buffer memory 216.

In this embodiment, the error checking and correcting circuit 214 is coupled to the processor 211 and configured to execute an error checking and correcting procedure to ensure correctness of data. Specifically, when the processor 211 receives the write command from the host system 10, the error checking and correcting circuit 214 generates an ECC (error correcting code) and/or an EDC (error detecting code) for data corresponding to the write command, and the processor 211 writes data corresponding to the write command and the corresponding ECC and/or the EDC into the rewritable non-volatile memory module 220. Then, when the processor 211 reads the data from the rewritable non-volatile memory module 220, the ECC and/or the EDC corresponding to the data are also read, and the error checking and correcting circuit 214 performs the error checking and correcting procedure on the read data based on the ECC and/or the EDC. In addition, after the error checking and correcting procedure is completed, if the read data is successfully decoded, the error checking and correcting circuit 214 can return an error bit value to the processor 211.

In an embodiment, the storage controller 210 further includes the buffer memory 216 and a power management circuit 217. The buffer memory 216 is coupled to the processor 211 and configured to temporarily store data and commands from the host system 10, data from the rewritable non-volatile memory module 220 or other system data for managing the storage device 20 so the processor 211 can rapidly access the data, the command or the system data from the buffer memory 216. The power management circuit 217 is coupled to the processor 211 and configured to control power of the storage device 20.

In the present embodiment, a garbage collection management circuit unit 215 includes a garbage collection execution circuit 2151 and a recycled block stripe recording circuit 2152. The garbage collection management circuit unit 215 is configured to receive a command from the processor 211 to execute a write command or a reprogramming operation. It should be noted that, in an embodiment, the garbage collection management circuit unit 215 may be integrated into the processor 211, so that the processor 211 can implement the data writing method provided by the embodiment. In addition, in another embodiment, the garbage collection management circuit unit 215 can also be implemented as a garbage collection management code module in the form of firmware or software, and accessed and executed by the processor 211 to realize the memory management method provided by the disclosure.

It should be noted that in the present embodiment, the garbage collection operation is directed at one block stripe. The details of the block stripe will be explained below through FIG. 3.

Figure 3:
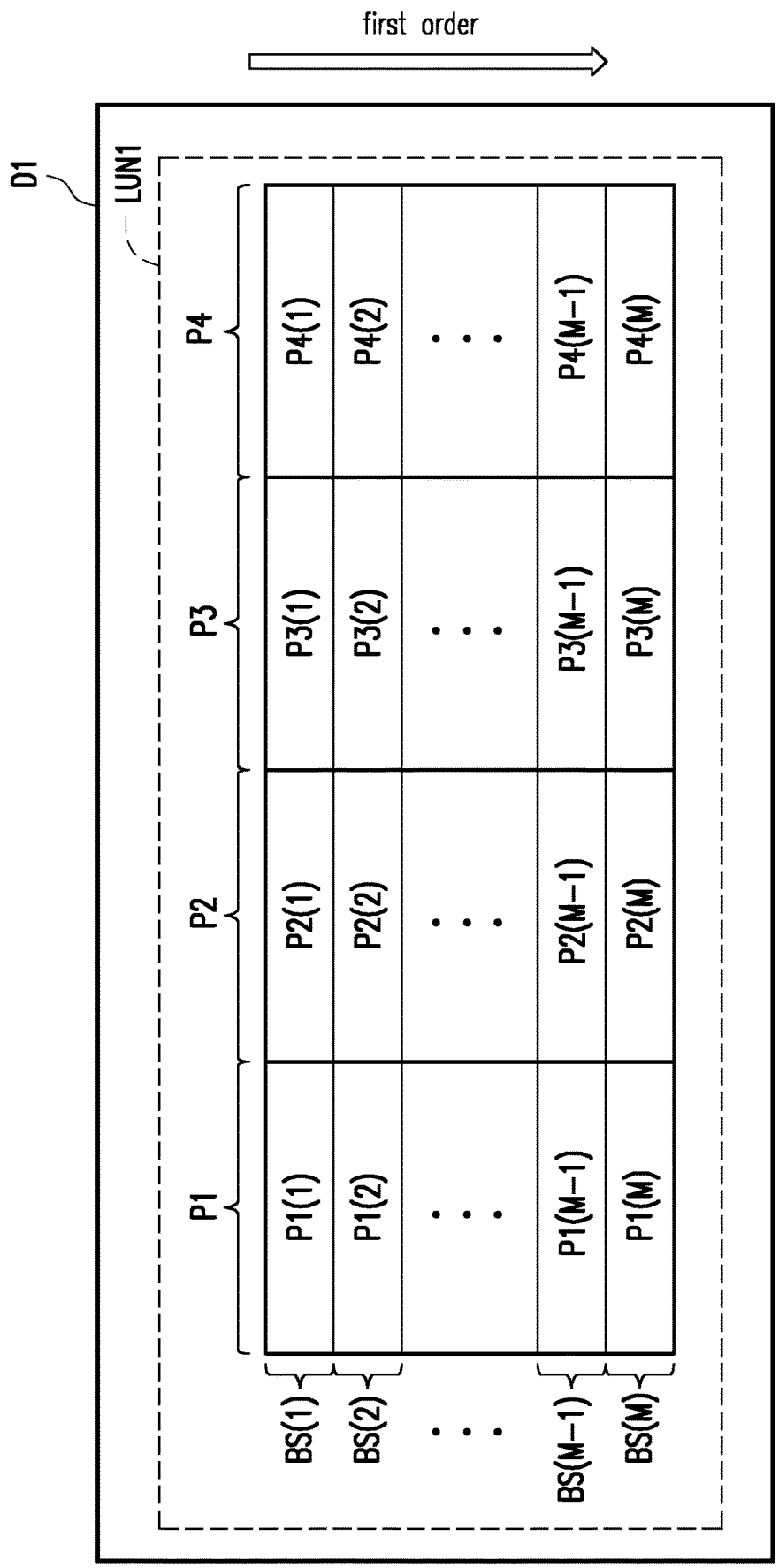
FIG. 3 is a schematic diagram illustrating a plurality of block stripes of a rewritable non-volatile memory module according to an embodiment of the disclosure.

FIG. 3 is a schematic diagram illustrating a plurality of block stripes of a rewritable non-volatile memory module according to an embodiment of the disclosure. Referring to FIG. 3, in the embodiment, the rewritable non-volatile memory module 220 may have a plurality of packages, each of the packages may have a plurality of physical blocks, and the plurality of physical blocks may be divided into N planes, and some or all of the planes may be logically divided into a logical unit number (LUN). For simplicity of explanation, it is assumed that the rewritable non-volatile memory module 220 has one package D1, and the package D1 has a plurality of physical blocks. The plurality of physical blocks are divided (grouped) into four planes P1 to P4 (N is equal to 4), wherein the four planes are divided into one logical number LUN1. In addition, each of the planes has M physical units arranged according to a first order. For example, plane P1 has M physical blocks P1(1)~P1(M); plane P2 has M physical blocks P2(1)~P2(M); plane P3 has M physical blocks P3(1)~P3(M); plane P4 has M physical blocks P4(1)~P4(M). In this embodiment, the physical blocks in the same order in each of the planes are grouped into one block stripe. For example, a block stripe BS(1) includes a physical block P1(1), a physical block P2(1), a physical block P3(1), and a physical block P4(1). That is to say, all the physical blocks in the above four planes may constitute M block stripes BS(1)~BS(M) arranged in the first order.

In this embodiment, the storage controller 210 sequentially writes data into a plurality of block stripes according to the order of the block stripes, and writes data according to the order of the planes P1 to P4 in the same block stripe. Assuming all the block stripes are blank, in order to write a written data that can fill four physical blocks, the storage controller 210 stores the written data into all physical blocks (e.g., physical block P1(1), physical block P2(1), physical block P3(1) and the physical block P4(1)) of the first blank block stripe from the first blank block stripe (block stripe BS(1) is used as an example) according to the first order. In another example, if the physical block P1(1) of the block stripe BS(1) is not available for storing the data, and other physical blocks are available for storing the written data, the storage controller 210 stores the written data into the physical block P2(1) of the block stripe BS(1), the physical block P3(1) and the physical block P4(1), and the physical block P1(2) of the block stripe BS(2).

In the embodiment, the garbage collection management circuit unit 215 (or the garbage collection execution circuit 2151) is configured to receive a command from the processor 211 to perform the garbage collection operation to one or more block stripes. The garbage collection management circuit unit 215 (or the recycled block stripe recording circuit 2152) is configured to record information corresponding to the one or more block stripes subjected to the garbage collection operation. The details of the data writing method provided in the embodiments of the disclosure and the functions of the storage controller 210 and the garbage collection management circuit unit 215 corresponding to the data writing method are described below with reference to a plurality of drawings.

Figure 2A:
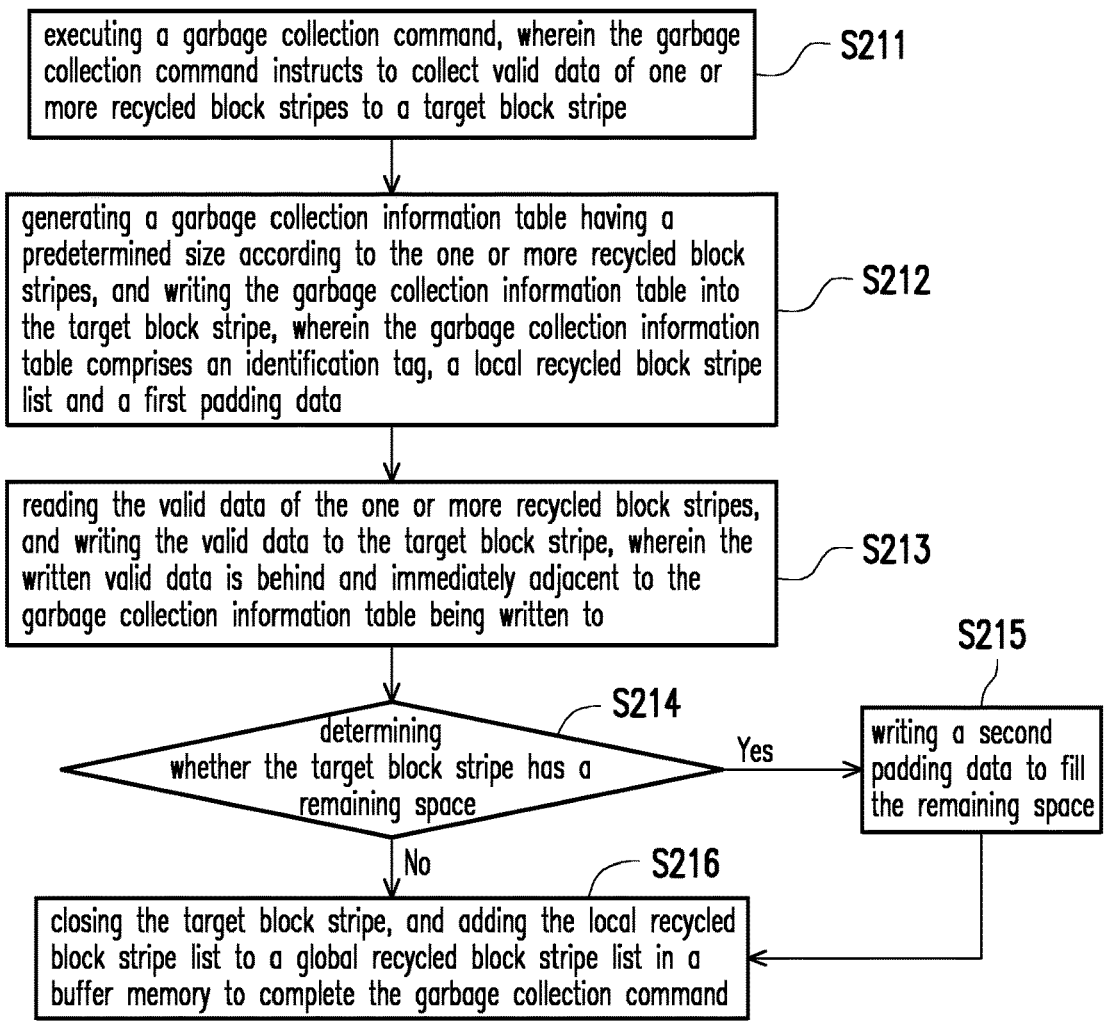
FIG. 2A is a flowchart of a memory management method according to an embodiment of the disclosure.

FIG. 2A is a flowchart illustrating a memory management method according to an embodiment of the disclosure. Referring to FIG. 1 and FIG. 2A, in step S211, the garbage collection management circuit unit 215 executes a garbage collection command, wherein the garbage collection command instructs to collect the valid data of the one or more recycled block stripes to the target block stripe.

Specifically, the processor 211 may record the valid data count values of the plurality of block stripes of the rewritable non-volatile memory module 220. When an empty block stripe has just been filled with data, the valid data count value of this block stripe is the largest. When the valid data count value of one block stripe is reduced below a valid data threshold value (or when the invalid data count of one block stripe is higher than an invalid data threshold value), the processor 211 records a block stripe index value of this block stripe to prepare for performing a garbage collection operation to this block stripe (also referred to as a source block stripe). On a specific occasion, the processor 211 may send a garbage collection command to the garbage collection management circuit unit 215 to instruct the garbage collection management circuit unit 215 to start performing a garbage collection operation to the source block stripe (also referred to as a recycled block stripe) described above, thereby collecting (copying) the valid data in the recycled block stripe to an available block stripe (also referred to as the target block stripe).

In other words, at least two kinds of information are included in the garbage collection command, one is information of a recycled block stripe from which valid data is collected, and the other is a target block stripe. The garbage collection management circuit unit 215 may identify, by the garbage collection command, a block stripe index value (also referred to as a recycled block stripe index value) of the one or more recycled block stripes instructed by the garbage collection command and a block stripe index value (also referred to as a target block stripe index value) of the target block stripe. A block stripe index value (e.g., BS(1) above) of one block stripe may be used to allow each component of the storage controller 210 to identify the block stripe and a plurality of physical blocks in the block stripe. In addition, the block stripe index value may also be used to represent the position of the corresponding block stripe in the rewritable non-volatile memory module 220.

It should be pointed out that the processor 211 may reuse the recycled block stripe. Specifically, the processor 211 may perform an erase operation to the recycled block stripe on an appropriate occasion (e.g., when the storage device is idling), so that the physical block in the recycled block stripe becomes a blank physical block to be written with data. In addition, in an embodiment, the processor 211 may also select a recycled block stripe first to perform a write operation, and perform an erase operation to the recycled block stripe before writing the data corresponding to the write operation.

Next, in step S212, the garbage collection management circuit unit 215 (or the recycled block stripe recording circuit 2152) generates a garbage collection information table having a predetermined size according to the one or more recycled block stripes, and writes the garbage collection information table into the target block stripe, wherein the garbage collection information table includes an identification tag, a local recycled block stripe list, and first padding data. The construction of the generated garbage collection information table is described below with reference to FIG. 4A.

Figure 4A:
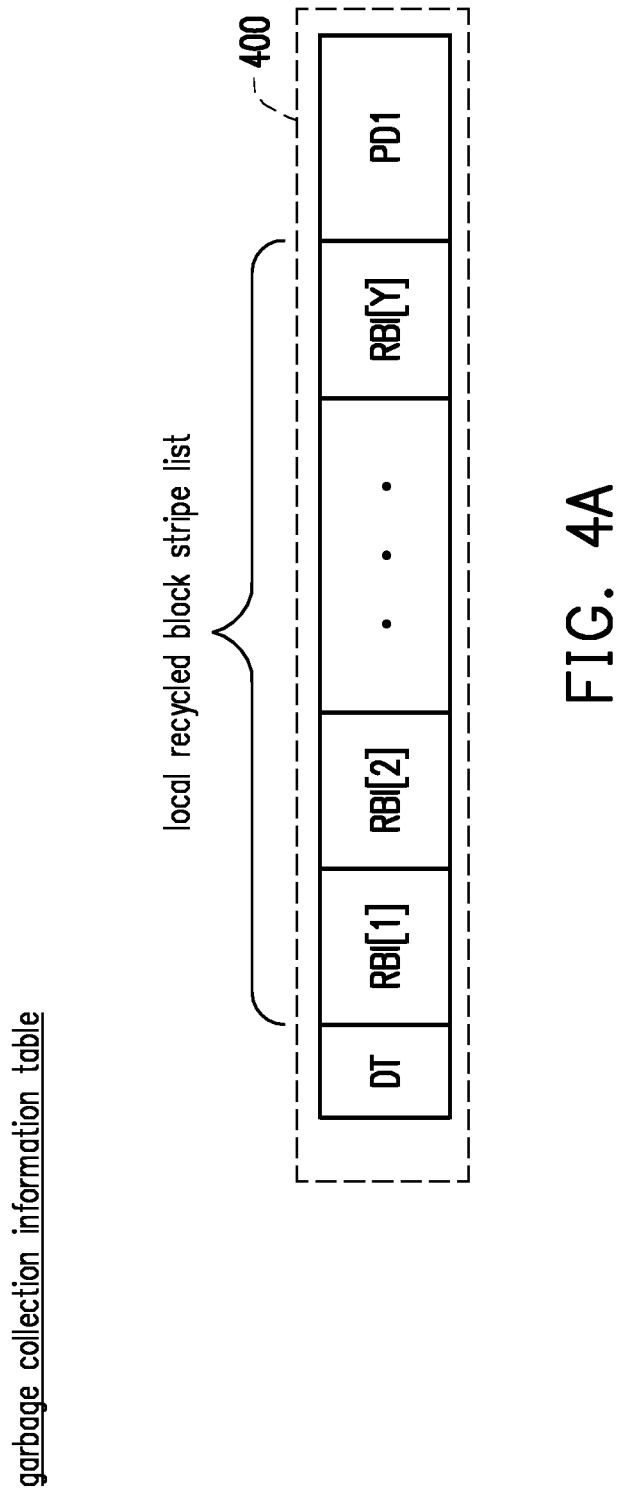
FIG. 4A is a schematic diagram illustrating a data structure of a garbage collection information table according to an embodiment of the disclosure.

FIG. 4A is a schematic diagram illustrating a data structure of a garbage collection information table according to an embodiment of the disclosure. Referring to FIG. 4A, in the embodiment, a garbage collection information table 400 mainly includes a local recycled block stripe list. The local recycled block stripe list is used to record one or more recycled block stripe index values RBI[1]~RBI[Y] of one or more recycled block stripes corresponding to the garbage collection command. Y is a positive integer.

Further, in the embodiment, for the convenience of data management, the size of the generated garbage collection information table is a predetermined size. The predetermined size is, for example, the size of one physical page or the size of one codeword, and the disclosure is not limited thereto. The garbage collection management circuit unit 215 (or the recycled block stripe recording circuit 2152) respectively adds a data tag DT and padding data PD1 (also referred to as the first padding data) in front of or behind the local recycled block stripe list to form the garbage collection information table 400.

The data tag DT is added to the forefront of the garbage collection information table 400, and the data tag DT is used to represent that the data tag DT and the plurality of data behind the data tag DT are garbage collection information table having a predetermined size. The space occupied by the data tag DT may be set in advance. The plurality of data includes a local recycled block stripe list and first padding data.

The first padding data PD1 is used to make a size of the garbage collection information table 400 a predetermined size. Specifically, the garbage collection management circuit unit 215 (or the recycled block stripe recording circuit 2152) calculates the total space occupied by the data tag DT and the recycled block stripe list in the currently updated garbage collection information table 400, and uses the difference obtained by deducting the total space size from the predetermined size as the size of the first padding data PD1. In this manner, after the first padding data PD1 is added behind the garbage collection information table 400, the total size of the garbage collection information table 400 is the predetermined size. On this occasion, the operation of generating the garbage collection information table 400 is completed. It should be noted that the size of the space occupied by the data tag DT and each of the recycled block stripe index values RBI[1]~RBI[Y] may be set in advance.

Figure 4B:
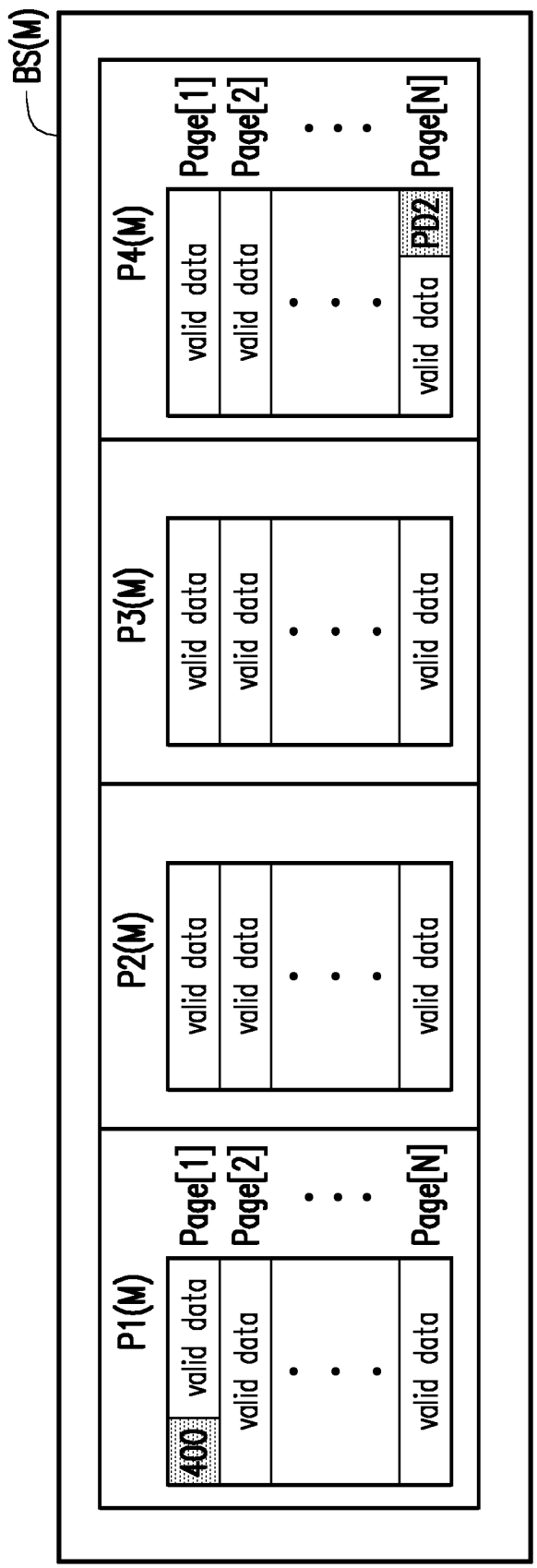
FIG. 4B is a schematic diagram of writing a garbage collection information table to a target block stripe according to an embodiment of the disclosure.

FIG. 4B is a schematic diagram illustrating writing a garbage collection information table to a target block stripe according to an embodiment of the disclosure. After the garbage collection information table is generated, the garbage collection management circuit unit 215 (or the recycled block stripe recording circuit 2152) instructs the memory interface control circuit 213 to write the generated garbage collection information table to the target block stripe.

For example, referring to FIG. 4B, it is assumed that there are physical blocks P1(M) to P4(M) corresponding to four planes in a blank target block stripe BS(M), and each of the physical blocks has N physical pages Page[1]~Page[N]. The garbage collection management circuit unit 215 (or the recycled block stripe recording circuit 2152) instructs the memory interface control circuit 213 to write the generated garbage collection information table 400 to the forefront of the first physical page Page[1] of the first physical block P1(M) of the target block stripe BS(M).

After writing the garbage collection information table, the valid data of the one or more recycled block stripes begins to be written into the target block stripe. That is, in step S213, the garbage collection management circuit unit 215 (or the garbage collection execution circuit 2151) instructs the memory interface control circuit 213 to read the valid data of the one or more recycled block stripes, and instructs the memory interface control circuit 213 to write the valid data into the target block stripe, wherein the written valid data is behind and immediately adjacent to the garbage collection information table being written to.

That is, in continuation of the example of FIG. 4B above, after the garbage collection information table 400 is being written to, the valid data in the one or more recycled block stripes is sequentially written to the target block stripe BS(M) and arranged behind the garbage collection information table 400 being written to. For example, the valid data is first written to the first physical page Page[1] of the physical block P1(M) and arranged behind the garbage collection information table 400 being written to, then written to other physical pages Page[2]~Page[N] of the physical block P1(M), and then written to the physical block P2(M), the physical block P3(M), and the physical block P4(M).

After writing the valid data in all of the one or more recycled block stripes, next, in step S214, the garbage collection management circuit unit 215 (or the garbage collection execution circuit 2151) determines whether the target block stripe has free space.

In response to that the target block stripe has remaining space, the process proceeds to step S215, and the garbage collection management circuit unit 215 (or the garbage collection execution circuit 2151) instructs the memory interface control circuit 213 to fill the remaining space with second padding data.

For example, in continuation of the example of FIG. 4B, it is assumed that after all valid data has been written, the last physical page Page[N] of the physical block P4(M) has space to write data (the target block stripe has remaining space). On this occasion, the garbage collection management circuit unit 215 (or the garbage collection execution circuit 2151) instructs the memory interface control circuit 213 to write the second padding data PD2 to the last physical page Page[N] of the physical block P4(M). Next, proceeding to step S216, the garbage collection management circuit unit 215 (or the garbage collection execution circuit 2151) instructs the memory interface control circuit 213 to close the target block stripe, and the garbage collection management circuit unit 215 (or the recycled block stripe recording circuit 2152) adds the local recycled block stripe list to the global recycled block stripe list in the buffer memory 216 to complete the garbage collection command. It should be noted that the mapping relationship between a plurality of logical addresses and a plurality of physical addresses for storing the valid data is also updated.

Specifically, after the second padding data PD2 is written, the target block stripe has no more available space, and all the physical blocks P1(M)~P4(M) of the target block stripe are closed, i.e., no more data can be written to. Next, the garbage collection management circuit unit 215 (or the recycled block stripe recording circuit 2152) adds the local recycled block stripe list corresponding to the one or more recycled block stripes to the global recycled block stripe list in the buffer memory 216 to allow the processor 211 to utilize the global recycled block stripe list in the buffer memory 216 to identify all of the recycled block stripes of the current rewritable non-volatile memory module 220.

Figure 4C:
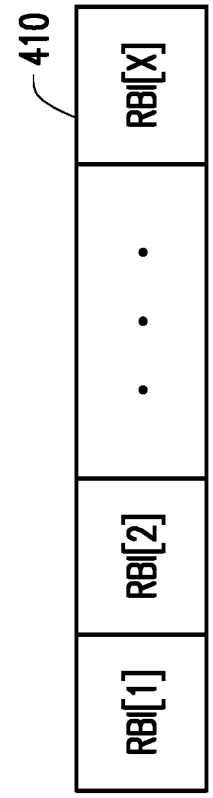
FIG. 4C is a schematic diagram illustrating a data structure of a global recycled block stripe list according to an embodiment of the disclosure.

FIG. 4C is a schematic diagram illustrating a data structure of a global recycled block stripe list according to an embodiment of the disclosure. Referring to FIG. 4C, the structure of the global recycled block stripe list 410 is similar to the local recycled block stripe list of the garbage collection information table 400. That is, the global recycled block stripe list 410 is used to record the recycled block stripe index values RBI[1]~RBI[X] of all of the recycled block stripes. X is a positive integer and greater than Y. That is, after the local recycled block stripe list corresponding to the one or more recycled block stripes is added to the global recycled block stripe list 410 in the buffer memory 216, the recycled block stripe index values RBI[1]~RBI[X] recorded in the global recycled block stripe list 410 contain the recycled block stripe index values RBI[1]~RBI[Y] recorded in the local recycled block stripe list.

After adding the local recycled block stripe list corresponding to the one or more recycled block stripes to the global recycled block stripe list 410 in the buffer memory 216, the garbage collection management circuit unit 215 (or the recycled block stripe recording circuit 2152) determines that the garbage collection command is completed. As described above, on this occasion, the processor 211 may correspondingly update the mapping relationship between the plurality of logical addresses and the plurality of physical addresses for storing the valid data.

Please return to FIG. 2A, on the other hand, after performing step S214, in response to that the target block stripe does not have remaining space, the recycled management circuit unit 215 (or the recycled block stripe recording circuit 2152) determines that it is not required to write the second padding data and step S216 is performed subsequently.

It should be understood that the disclosure provides no limitation to the method of setting the bit values of the first and second padding data PD1 and PD2. For example, the first and second padding data PD1 and PD2 may be generated using a random function. Or, the first and second padding data PD1 and PD2 may be generated by using data having fixed aspect.

In the embodiment, other than updating the global recycled block stripe list in response to the performed garbage collection operation, it is also possible to determine whether to update the global recycled block stripe list according to the use of the block stripe.

Figure 2B:
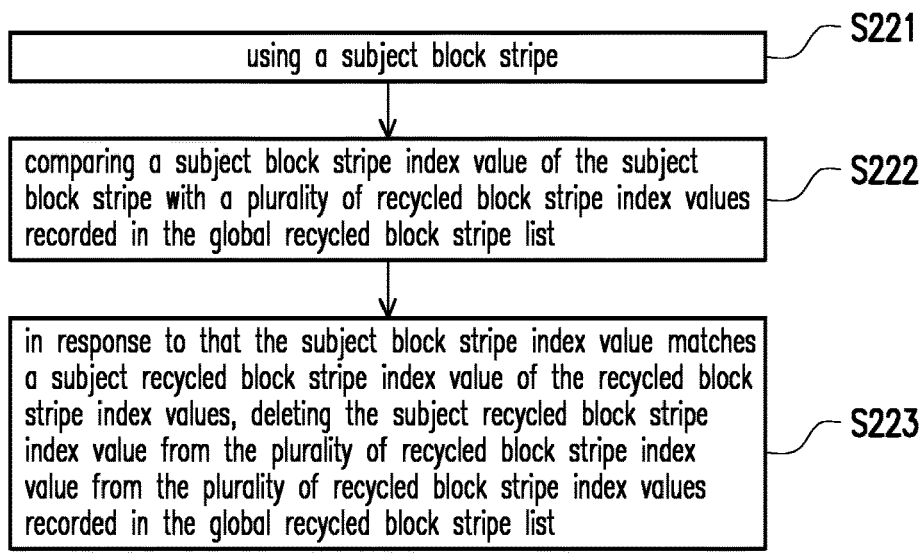
FIG. 2B is a flowchart of a memory management method according to an embodiment of the disclosure.

FIG. 2B is a flowchart illustrating a memory management method according to an embodiment of the disclosure.

Referring to FIG. 2B, in step S221, the processor 211 uses a subject block stripe. Specifically, when the processor 211 is to perform a write operation or a data merging operation to write a data, the processor 211 may select one or more of the available block stripes (also referred to as subject block stripe) among a plurality of available block stripes from the rewritable non-volatile memory module 220 to write the data. The selected subject block stripe for writing the data may also be regarded as used subject block stripe. The available block stripe includes a recycled block stripe, a free block stripe or an empty block stripe that has completed the garbage collection operation. In this embodiment, the processor 211 records a timestamp (also referred to as the block stripe timestamp) corresponding to the subject block stripe to a system physical block according to the time point at which the subject block stripe is selected for use. Alternatively, in another embodiment, the subject block stripe inherently has a spare area to store meta data corresponding to the subject block stripe, and the meta data may record the block stripe timestamp of the subject block stripe.

Next, in step S222, the garbage collection management circuit unit 215 (or the recycled block stripe recording circuit 2152) compares the subject block stripe index value of the subject block stripe with the plurality of recycled block stripe index values recorded in the global recycled block stripe list. Specifically, the garbage collection management circuit unit 215 (or the recycled block stripe recording circuit 2152) identifies the block stripe index value (also referred to as the subject block stripe index value) of the used subject block stripe, and compares all of the recycled block stripe index values in the global recycled block stripe list according to the subject block strip index value to find whether there is a recycled block stripe index value that matches/is equal to the subject block stripe index value.

Next, in step S223, in response to that the subject block stripe index value matches a subject recycled block stripe index value of the plurality of recycled block stripe index values, the garbage collection management circuit unit 215 (or the recycled block stripe recording circuit 2152) deletes the subject recycled block stripe index value from the plurality of recycled block stripe index values recorded in the global recycled block stripe list. In this manner, the operation of updating the global recycled block stripe list performed due to the use of the subject block stripe is completed. When the subject recycled block stripe index value of the global recycled block stripe list is deleted, all of the recycled block stripe index values arranged behind the deleted subject recycled block stripe index value are moved forward. For example, when the subject recycled block stripe index value RBI[1] is deleted, the recycled block stripe index values RBI[2] to RBI[X] behind the subject recycled block stripe index value RBI[1] are moved forward. That is, the global recycled block stripe list is arranged from the recycled block stripe index value RBI[2] to the recycled block stripe index value RBI[X]. It should be noted that the size of the space occupied by each of the recycled block stripe index values may be set in advance.

It should be noted that after the update operation of such aspect is completed, the snapshot operation is not performed to the global recycled block stripe list currently maintained in the buffer memory 216, that is, the global recycled block stripe list of the buffer memory 216 is not written to the rewritable non-volatile memory module 220.

Since the global recycled block stripe list is only stored in the buffer memory 216, if a sudden power-off event (also referred to as a sudden power failure event) is occurred to the storage device, the global recycled block stripe list and other data stored in the buffer memory 216 will be lost. Accordingly, the garbage collection management circuit unit 215 may perform a recovery operation in response to the sudden power-off event in an attempt to restore the global recycled block stripe list existed before the sudden power-off event in the buffer memory 216.

Figure 5:
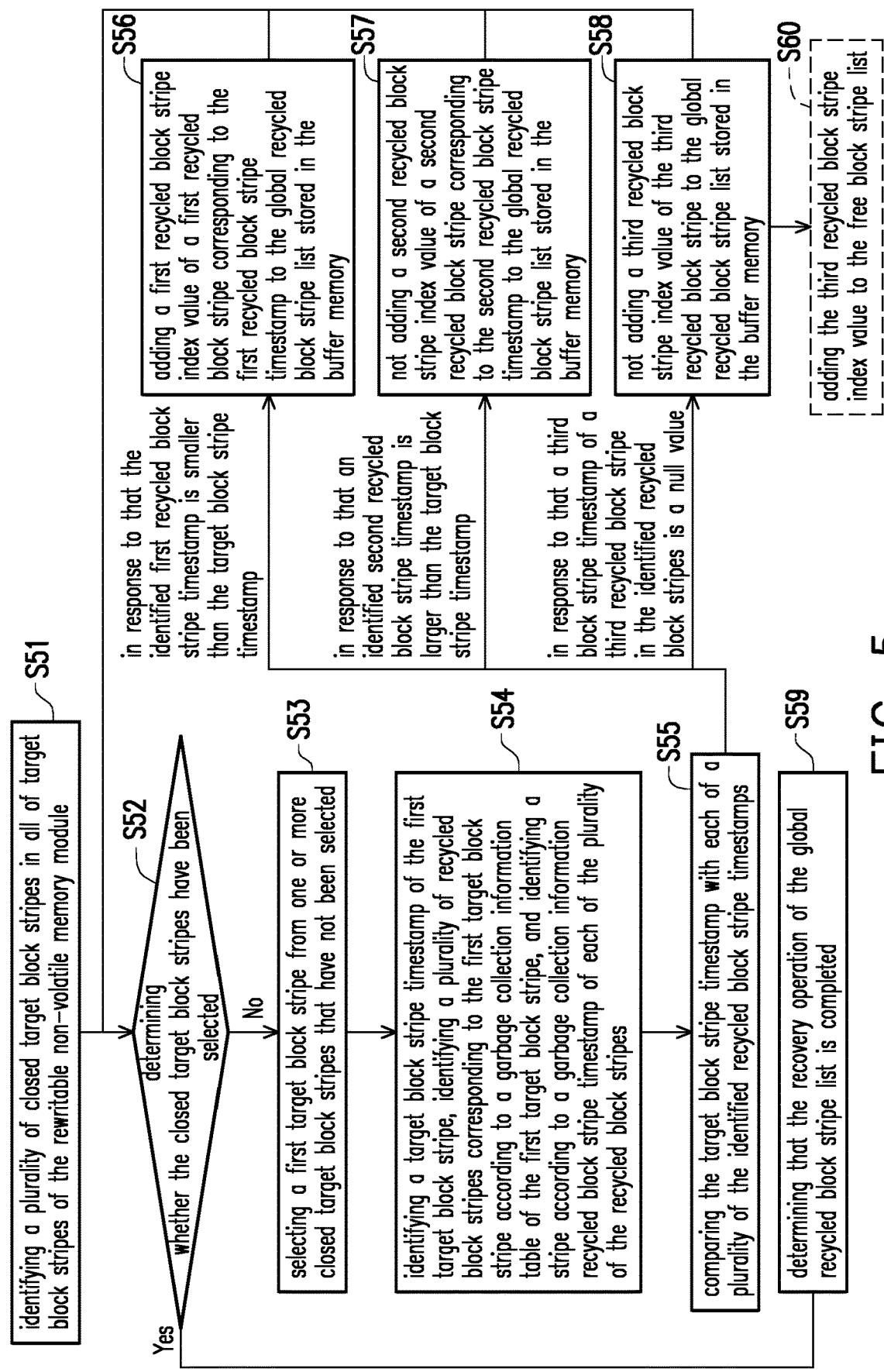
FIG. 5 is a flowchart showing a recovery operation according to an embodiment of the disclosure.

FIG. 5 is a flowchart illustrating a recovery operation according to an embodiment of the disclosure. Referring to FIG. 5, in step S51, the garbage recycled management circuit unit 215 (or the recycled block stripe recording circuit 2152) identifies a plurality of closed target block stripes in all of the target block stripes of the rewritable non-volatile memory module 220. Specifically, the garbage recycled management circuit unit 215 (or the recycled block stripe recording circuit 2152) may utilize the data tag DT to identify a plurality of target block stripes from all of the block stripes of the rewritable non-volatile memory module 220. That is, the block stripe in front of which the garbage collection information table is stored is identified as the target block stripe. Further, in response to the step S216, the target block stripe that has been closed can be regarded as completing the garbage collection operation.

On the contrary, when the target block stripe subjected to the garbage collection operation is not closed, the processor 211 or the garbage recycled management circuit unit 215 determines that operation performed to the garbage recycled block of the target block stripe (also referred to as unclosed target block stripe) is not completed, that is, the valid data in the one or more recycled block stripes corresponding to the unclosed target block stripe are not all collected/copied into the unclosed target block stripe. Therefore, the global recycled block stripe list should not have one or more recycled block stripes of the unclosed target block stripe. That is, in the recovery operation of the global recycled block stripe list, the garbage recycled management circuit unit 215 ignores the garbage collection information table of the unclosed target block stripe. It should be noted that, in an embodiment, in response to the identified unclosed target block stripe, the processor 211 or the garbage recycled management circuit unit 215 may re-execute the garbage collection operation corresponding to one or more recycled block stripes of the target block stripe.

After identifying the plurality of closed target block stripes, proceeding to step S52, the garbage recycled management circuit unit 215 (or the recycled block stripe recording circuit 2152) determines whether the plurality of closed target block stripes have been selected. Specifically, the garbage recycled management circuit unit 215 (or the recycled block stripe recording circuit 2152) starts to select the closed target block stripes that have not been selected one by one from the plurality of closed target block stripes to perform the recovery operation until all of the closed target block stripes have been selected to perform the recovery operation. If there is any closed target block stripe that has not been selected, proceeding to step S53, the garbage recycled management circuit unit 215 (or the recycled block stripe recording circuit 2152) selects a first target block stripe from the one or more closed target block stripes that have not been selected.

Next, in step S54, the garbage recycled management circuit unit 215 (or the recycled block stripe recording circuit 2152) identifies a target block stripe timestamp of the first target block stripe, identifies a plurality of recycled block stripes corresponding to the first target block stripe according to the garbage collection information table of the first target block stripe, and identifies a recycled block stripe timestamp of each of the plurality of recycled block stripes. Specifically, after selecting the first target block stripe, the garbage recycled management circuit unit 215 (or the recycled block stripe recording circuit 2152) identifies the target block stripe timestamp of the first target block stripe according to the block stripe index value of the first target block stripe (e.g., through reading meta data corresponding to the target block stripe in the system physical block), and reads the garbage collection information table of the first target block stripe. From the read garbage collection information table, the garbage recycled management circuit unit 215 (or the recycled block stripe recording circuit 2152) may identify the recycled block stripe index value of the plurality of recycled block stripes corresponding to the first target block stripe, and identify a recycled block stripe timestamp of each of the plurality of recycled block stripes according to the plurality of recycled block stripe index values (e.g., through reading the meta data corresponding to the plurality of recycled block stripes in the system physical block).

Next, in step S55, the garbage recycled management circuit unit 215 (or the recycled block stripe recording circuit 2152) compares the target block stripe timestamp with each of a plurality of the identified recycled block stripe timestamps. Next, different processes are performed according to different comparison results, which are described in detail below.

In response to that an identified first recycled block stripe timestamp is smaller than the target block stripe timestamp, proceeding to step S56, the garbage recycled management circuit unit 215 (or the recycled block stripe recording circuit 2152) adds the first recycled block stripe index value of the first recycled block stripe corresponding to the first recycled block stripe timestamp to the global recycled block stripe list stored in the buffer memory.

On the other hand, in response to that an identified second recycled block stripe timestamp is larger than the target block stripe timestamp, proceeding to step S57, the garbage recycled management circuit unit 215 (or the recycled block stripe recording circuit 2152) does not add a second recycled block stripe index value of the second recycled block stripe corresponding to the second recycled block stripe timestamp to the global recycled block stripe list stored in the buffer memory. That is, the garbage recycled management circuit unit 215 (or the recycled block stripe recording circuit 2152) interprets that the second recycled block stripe is used again after the corresponding garbage collection operation is completed, which causes that the second recycled block stripe timestamp of the second recycled block stripe to be larger than the target block stripe timestamp.

In addition, in response to that a third block stripe timestamp of a third recycled block stripe in the plurality of identified recycled block stripes is a null value (e.g., the third recycled block stripe timestamp of the third recycled block stripe corresponding to the third recycled block stripe index value does not exist), proceeding to step S58, the garbage recycled management circuit unit 215 (or the recycled block stripe recording circuit 2152) does not add the third recycled block stripe index value of the third recycled block stripe to the global recycled block stripe list stored in the buffer memory.

In this embodiment, in the case where the third block stripe timestamp of the third recycled block stripe corresponding to the third recycled block stripe index value does not exist or is a null value, the garbage recycled management circuit unit 215 (or the recycled block stripe recording circuit 2152) may determine that the third recycled block stripe has been subjected to erase operation, which causes that the block stripe timestamp of the third recycled block stripe to be deleted. Next, in an embodiment, step S58 is followed by step S60, and the garbage recycled management circuit unit 215 (or the recycled block stripe recording circuit 2152) may notify the processor 211 to add the third recycled block stripe index value to the free block stripe list. The free block stripe list is maintained in the buffer memory 216, and the plurality of block stripes corresponding to the plurality of block stripe index values recorded in the free block stripe list are all erased.

After all the block stripe timestamps are compared with the information table timestamp and the subsequent operations (e.g., steps S56, S57, S58) corresponding to the comparison result are also completed, the garbage recycled management circuit unit 215 (or the recycled block stripe recording circuit 2152) also completes a recovery operation corresponding to the selected first target block stripe. Next, the process flow returns to step S52, that is, the garbage recycled management circuit unit 215 (or the recycled block stripe recording circuit 2152) selects another new closed target block stripe that has not been selected to perform the recovery operation.

If the garbage recycled management circuit unit 215 (or the recycled block stripe recording circuit 2152) determines in step S52 that the plurality of closed target block stripes have been selected, proceeding to step S59, and the garbage recycled management circuit unit 215 (or the recycled block stripe recording circuit 2152) determines that the recovery operation of the global recycled block stripe list is completed.

It should be indicated that, in the above embodiment, since the garbage collection operation is directed at one or more recycled block stripes, the garbage collection information table records information corresponding to the one or more recycled block stripes. However, the disclosure is not limited thereto. For example, in another embodiment, the garbage collection operation is directed at one or more recycled physical blocks, and thus the garbage collection information table records information corresponding to the one or more recycled physical blocks. In addition, the garbage collection information table is written to the forefront of the target physical block corresponding to one or more recycled physical blocks.

In summary, the memory management method and the storage controller provided by the embodiments of the disclosure are capable of generating the garbage collection information table according to the recycled block stripe subjected to the garbage collection operation only when responding to starting the garbage collection operation, writing the garbage collection information table to the target block stripe corresponding to the garbage collection operation, and copying the valid data of the recycled block stripe to the target block stripe having the garbage collection information table, thereby completing the garbage collection operation. In addition, the garbage collection information table in each of the target block stripes may also be used to rebuild the global recycled block stripe list to assist in managing the use of the block stripe of the overall storage device. In this way, in the condition where the access delay caused by the garbage collection operation is reduced, the data stored in the storage device can still have reliability, thereby improving the operation efficiency of the storage device.

Although the disclosure has been disclosed by the above embodiments, the embodiments are not intended to limit the disclosure. It will be apparent to those skilled in the art that various modifications and variations can be made to the structure of the disclosure without departing from the scope or spirit of the disclosure. Therefore, the protecting range of the disclosure falls in the appended claims.

What is claimed is:

1. A memory management method, adapted for a storage device equipped with a rewritable non-volatile memory module, wherein the rewritable non-volatile memory module has a plurality of physical blocks, wherein the plurality of physical blocks are grouped into a plurality of block stripes, the method comprising:
   executing a garbage collection command, wherein the garbage collection command instructs to collect valid data of one or more recycled block stripes to a target block stripe;
   generating a garbage collection information table having a predetermined size according to the one or more recycled block stripes, and writing the garbage collection information table to the target block stripe, wherein the garbage collection information table comprises an identification tag, a local recycled block stripe list and a first padding data;
   reading the valid data of the one or more recycled block stripes, and writing the valid data to the target block stripe, wherein the written valid data is behind and immediately adjacent to the garbage collection information table being written to; and
   closing the target block stripe, and adding the local recycled block stripe list to a global recycled block stripe list in a buffer memory to complete the garbage collection command.

2. The memory management method according to claim 1, wherein after the step of writing the valid data to the target block stripe, the memory management method further comprises:
   in response to determining that the target block stripe has a remaining space, writing a second padding data to fill the remaining space.

3. The memory management method according to claim 1, wherein
   a data tag is at a forefront of the garbage collection information table, and the data tag represents that the data tag and a plurality of data behind the data tag are the garbage collection information table having the predetermined size,
   wherein the plurality of data behind the data tag are sequentially the local recycled block stripe list and the first padding data,
   wherein the local recycled block stripe list records a recycled block stripe index value of the one or more recycled block stripes,
   wherein the first padding data makes a size of the garbage collection information table be the predetermined size.

4. The memory management method according to claim 1, further comprising:
   using a subject block stripe,
   comparing a subject block stripe index value of the subject block stripe with a plurality of recycled block stripe index values recorded in the global recycled block stripe list; and
   in response to that the subject block stripe index value matches a subject recycled block stripe index value of the recycled block stripe index values, deleting the subject recycled block stripe index value from the plurality of recycled block stripe index values recorded in the global recycled block stripe list.

5. The memory management method according to claim 1, further comprising:
   performing a recovery operation corresponding to the global recycled block stripe list,
   wherein the recovery operation comprises:
      identifying a plurality of closed target block stripes in all of target block stripes of the rewritable non-volatile memory module;
      determining whether the closed target block stripes have been selected, wherein in response to determining that the closed target block stripes have been selected, determining that the recovery operation of the global recycled block stripe list is completed,
      wherein in response to determining that the closed target block stripes have not been selected, selecting a first target block stripe from one or more closed target block stripes that have not been selected;
      identifying a target block stripe timestamp of the first target block stripe, identifying a plurality of recycled block stripes corresponding to the first target block stripe according to a garbage collection information table of the first target block stripe, and identifying a recycled block stripe timestamp of each of the plurality of the recycled block stripes;
      comparing the target block stripe timestamp with each of a plurality of the identified recycled block stripe timestamps,
      wherein in response to that an identified first recycled block stripe timestamp is smaller than the target block stripe timestamp, adding a first recycled block stripe index value of a first recycled block stripe corresponding to the first recycled block stripe timestamp to the global recycled block stripe list stored in the buffer memory,
      wherein in response to that an identified second recycled block stripe timestamp is larger than the target block stripe timestamp, a second recycled block stripe index value of a second recycled block stripe corresponding to the second recycled block stripe timestamp is not added to the global recycled block stripe list stored in the buffer memory,
      wherein in response to that a third block stripe timestamp of a third recycled block stripe in the identified recycled block stripes is a null value, a third recycled block stripe index value of the third recycled block stripe is not added to the global recycled block stripe list stored in the buffer memory.

6. A storage controller for controlling a storage device equipped with a rewritable non-volatile memory module, the storage controller comprising:
   a connection interface circuit, coupled to a host system;
   a memory interface control circuit, coupled to the rewritable non-volatile memory module, wherein the rewritable non-volatile memory module has a plurality of physical blocks, wherein the plurality of physical blocks are grouped into a plurality of block stripes;
   a garbage collection management circuit unit; and
   a processor, coupled to the connection interface circuit, the memory interface control circuit, and the garbage collection management circuit unit,
   wherein the garbage collection management circuit unit is configured to execute a garbage collection command received from the processor, wherein the garbage collection command instructs to collect valid data of one or more recycled block stripes to a target block stripe,
   wherein the garbage collection management circuit unit is further configured to generate a garbage collection information table having a predetermined size according to the one or more recycled block stripes, and instruct the memory interface control circuit to write the garbage collection information table to the target block stripe, wherein the garbage collection information table comprises an identification tag, a local recycled block stripe list and a first padding data, wherein the garbage collection management circuit unit is further configured to instruct the memory interface control circuit to read the valid data of the one or more recycled block stripes, and instruct the memory interface control circuit to write the valid data to the target block stripe, wherein the written valid data is behind and immediately adjacent to the garbage collection information table being written to, wherein the garbage collection management circuit unit is further configured to instruct the memory interface control circuit to close the target block stripe, and the garbage collection management circuit unit is further configured to add the local recycled block stripe list to a global recycled block stripe list in a buffer memory to complete the garbage collection command.

7. The storage controller according to claim 6, wherein after the operation of writing the valid data to the target block stripe, in response to determining that the target block stripe has a remaining space, the garbage recycled management circuit unit instructs the memory interface control circuit to fill the remaining space with a second padding data.

8. The storage controller according to claim 6, wherein a data tag is at a forefront of the garbage collection information table, and the data tag represents that the data tag and a plurality of data behind the data tag are the garbage collection information table having the predetermined size, wherein the plurality of data behind the data tag are sequentially the local recycled block stripe list and the first padding data, wherein the local recycled block stripe list records a recycled block stripe index value of the one or more recycled block stripes, wherein the first padding data makes a size of the garbage collection information table be the predetermined size.

9. The storage controller according to claim 6, wherein the processor uses a subject block stripe, wherein the garbage recycled management circuit unit compares a subject block stripe index value of the subject block stripe with a plurality of recycled block stripe index values recorded in the global recycled block stripe list, in response to that the subject block stripe index value matches a subject recycled block stripe index value of the recycled block stripe index values, the garbage recycled management circuit unit deletes the subject recycled block stripe index value from the plurality of recycled block stripe index values recorded in the global recycled block stripe list.

10. The storage controller according to claim 6, wherein the processor further instructs the garbage recycled management circuit unit to perform a recovery operation corresponding to the global recycled block stripe list, wherein the recovery operation comprises:

the garbage recycled management circuit unit identifies a plurality of closed target block stripes in all of target block stripes of the rewritable non-volatile memory module, wherein the garbage recycled management circuit unit determines whether the closed target block stripes have been selected, wherein n response to determining that the closed target block stripes have been selected, the garbage recycled management circuit unit determines that the recovery operation of the global recycled block stripe list is completed, wherein in response to determining that the closed target block stripes have not been selected, the garbage recycled management circuit unit selects a first target block stripe from one or more closed target block stripes that have not been selected;

wherein the garbage recycled management circuit unit identifies a target block stripe timestamp of the first target block stripe, identifies a plurality of recycled block stripes corresponding to the first target block stripe according to a garbage collection information table of the first target block stripe, and identifies a recycled block stripe timestamp of each of the plurality of the recycled block stripes;

wherein the garbage recycled management circuit unit compares the target block stripe timestamp with each of a plurality of identified recycled block stripe timestamps, wherein in response to that an identified first recycled block stripe timestamp is smaller than the target block stripe timestamp, the garbage recycled management circuit unit adds a first recycled block stripe index value of a first recycled block stripe corresponding to the first recycled block stripe timestamp to the global recycled block stripe list stored in the buffer memory, wherein in response to that an identified second recycled block stripe timestamp is larger than the target block stripe timestamp, the garbage recycled management circuit unit does not add a second recycled block stripe index value of a second recycled block stripe corresponding to the second recycled block stripe timestamp to the global recycled block stripe list stored in the buffer memory, wherein in response to that a third block stripe timestamp of a third recycled block stripe in the identified recycled block stripes is a null value, the garbage recycled management circuit unit does not add a third recycled block stripe index value of the third recycled block stripe to the global recycled block stripe list stored in the buffer memory.

* * * * *